United States Patent
Ju et al.

(10) Patent No.: US 11,330,957 B2
(45) Date of Patent: May 17, 2022

(54) DISHWASHER AND METHOD OF CONTROLLING THE SAME

(71) Applicant: LG Electronics Inc., Seoul (KR)

(72) Inventors: Byeonghyeon Ju, Seoul (KR); Youmin Lee, Seoul (KR); Taehee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 16/495,031

(22) PCT Filed: Mar. 15, 2018

(86) PCT No.: PCT/KR2018/003035
§ 371 (c)(1),
(2) Date: Sep. 17, 2019

(87) PCT Pub. No.: WO2018/169322
PCT Pub. Date: Sep. 20, 2018

(65) Prior Publication Data
US 2020/0008644 A1     Jan. 9, 2020

(30) Foreign Application Priority Data

Mar. 17, 2017 (KR) ........................ 10-2017-0033621

(51) Int. Cl.
    *A47L 15/42*         (2006.01)
    *B01D 29/15*       (2006.01)
    (Continued)

(52) U.S. Cl.
CPC ....... *A47L 15/4208* (2013.01); *A47L 15/0005* (2013.01); *A47L 15/0039* (2013.01);
(Continued)

(58) Field of Classification Search
CPC ............. A47L 15/0031; A47L 15/0039; A47L 15/4225; A47L 15/4219; A47L 15/0005;
(Continued)

(56) References Cited

U.S. PATENT DOCUMENTS

2002/0157995 A1* 10/2002 Hegeman ............ A47L 15/4204
                                                               210/97
2005/0051201 A1* 3/2005 Ashton ............... A47L 15/4246
                                                              134/104.1
(Continued)

FOREIGN PATENT DOCUMENTS

KR       1020000002679         1/2000
KR         100269467        12/2000
(Continued)

OTHER PUBLICATIONS

PCT International Search Report and Written Opinion in International Application No. PCT/KR2018/003035, dated Jul. 18, 2018, 15 pages.

(Continued)

*Primary Examiner* — Benjamin L Osterhout
(74) *Attorney, Agent, or Firm* — Fish & Richardson P.C.

(57) ABSTRACT

A dishwasher and a control method thereof are disclosed. The dishwasher includes a tub accommodating an object to be washed, a spray arm rotatably provided inside the tub to spray wash water toward the object to be washed, a sump for storing wash water and collecting wash water sprayed into the tub therein, a filter separably mounted to the sump to remove foreign substances from wash water, a wash pump for supplying wash water stored in the sump to the spray arm, and a circulation passage for diverting at least a portion of the wash water supplied to the spray arm by the wash pump to the sump. After the dishes are washed, all of the wash water introduced into the wash pump is diverted into the filter. Foreign substances present in the wash water are (Continued)

collected in the filter and are discharged outside along with the wash water.

19 Claims, 12 Drawing Sheets

(51) Int. Cl.
    *A47L 15/23*       (2006.01)
    *A47L 15/00*       (2006.01)
    *B01D 29/66*     (2006.01)

(52) U.S. Cl.
    CPC .......... *A47L 15/23* (2013.01); *A47L 15/4206* (2013.01); *A47L 15/4219* (2013.01); *A47L 15/4225* (2013.01); *B01D 29/15* (2013.01); *B01D 29/66* (2013.01); *A47L 2401/10* (2013.01); *A47L 2501/03* (2013.01); *A47L 2501/04* (2013.01); *B01D 2201/08* (2013.01); *B01D 2201/287* (2013.01)

(58) Field of Classification Search
    CPC ............. A47L 15/4206; A47L 15/4221; A47L 15/4208; A47L 15/23; A47L 2501/04; A47L 2501/05; A47L 2401/10; A47L 2501/03; B01D 29/15; B01D 29/66; B01D 2201/287; B01D 2201/08
    See application file for complete search history.

(56) References Cited

U.S. PATENT DOCUMENTS

| | | | |
|---|---|---|---|
| 2006/0005863 A1 | 1/2006 | Gurubatham et al. | |
| 2006/0060222 A1* | 3/2006 | Park | A47L 15/4219 134/56 D |
| 2006/0237049 A1 | 10/2006 | Weaver et al. | |
| 2006/0237050 A1 | 10/2006 | Weaver et al. | |
| 2007/0102025 A1* | 5/2007 | Ahn | A47L 15/0015 134/25.2 |
| 2008/0060690 A1* | 3/2008 | Buser | A47L 15/4236 134/58 D |
| 2008/0237154 A1* | 10/2008 | Bragg | A47L 15/4204 210/808 |
| 2008/0295865 A1* | 12/2008 | Ahn | A47L 15/0015 134/18 |
| 2012/0312337 A1 | 12/2012 | Boyer et al. | |
| 2014/0182625 A1* | 7/2014 | Lee | A47L 15/4221 134/18 |
| 2017/0086641 A1* | 3/2017 | Kim | A47L 15/4204 |

FOREIGN PATENT DOCUMENTS

| | | |
|---|---|---|
| KR | 1020060027046 | 3/2006 |
| KR | 1020100052208 | 5/2010 |
| KR | 1020120138022 | 12/2012 |
| KR | 1020130070275 | 6/2013 |
| KR | 1020130071355 | 6/2013 |
| KR | 1020170011113 | 2/2017 |
| WO | WO2011076650 | 6/2011 |

OTHER PUBLICATIONS

Extended European Search Report in European Application No. 18767984.0, dated Nov. 25, 2020, 9 pages.

KR Office Action in Korean Appln. No. 10-2017-0033621, dated Apr. 28, 2021, 15 pages (with English translation).

\* cited by examiner (a)

(b)

(a)

(b)

DISHWASHER AND METHOD OF CONTROLLING THE SAME

CROSS-REFERENCE TO RELATED APPLICATIONS

This application is a National Stage application under 35 U.S.C. § 371 of International Application No. PCT/KR2018/003035, filed on Mar. 15, 2018, which claims the benefit of Korean Patent Application No. 10-2017-0033621, filed on Mar. 17, 2017. The disclosures of the prior applications are incorporated by reference in their entirety.

TECHNICAL FIELD

The present invention relates to a dishwasher and a method of controlling the same, and more particularly, to a dishwasher capable of removing foreign substances from wash water by diverting some or all of wash water that is supplied to a spray arm to the interior of a filter, and a method of controlling the dishwasher.

BACKGROUND ART

A dishwasher is an appliance that removes dirt such as food waste or the like from dishes, cookware, etc. (hereinafter referred to as an "object to be washed") using a detergent and wash water.

Such a dishwasher typically includes a tub defining a washing compartment, a dish rack provided in the tub, in which an object to be washed is accommodated, a spray arm for spraying wash water toward the dish rack, a sump for storing wash water and supplying the wash water to the spray arm, and a filter for removing foreign substances from the wash water inside the sump.

In the dishwasher having the above construction, the wash water stored in the sump is sprayed toward an object to be washed through the spray arm, and the sprayed wash water is collected in the sump. The collected wash water passes through the filter so that foreign substances present in the wash water are removed therefrom, and the filtered wash water is again sprayed toward the object to be washed through the spray arm. Thereafter, all of the wash water that is present in the sump is discharged therefrom. At this time, the foreign substances collected in the filter may also be discharged along with the wash water.

In the above-described dishwasher, a constant amount of wash water circulates and is again sprayed toward an object to be washed. However, if foreign substances are not completely removed from wash water, an object to be washed that has already been completely washed may be recontaminated.

Further, foreign substances accumulated on the outer circumferential surface of the filter are not discharged along with wash water and adhere to the filter, which may deteriorate the performance of the filter.

DISCLOSURE

Technical Problem

An object of the present invention is to provide a dishwasher capable of diverting some or all of wash water that is supplied to a spray arm to the interior of a filter.

Another object of the present invention is to provide a method of removing foreign substances from wash water that is supplied to a spray arm using the above dishwasher.

A further object of the present invention is to provide a method of discharging foreign substances from a sump along with wash water using the above dishwasher.

A further object of the present invention is to provide a method of removing foreign substances accumulated on the filter using the above dishwasher.

Technical Solution

To achieve the object and other advantages and in accordance with the purpose of the invention, as embodied and broadly described herein, a dishwasher includes a tub configured to accommodate an object to be washed, a spray arm rotatably provided inside the tub, the spray arm being configured to spray wash water toward the object to be washed, a sump configured to store wash water and to collect wash water sprayed into the tub therein, a filter separably mounted to the sump, the filter being configured to remove foreign substances from wash water, a wash pump configured to supply wash water stored in the sump to the spray arm, and a circulation passage configured to divert at least a portion of wash water that is supplied to the spray arm by the wash pump to the sump. The circulation passage supplies wash water to the interior of the filter.

The filter may have an open bottom. The sump may include a filter support portion configured to support the bottom of the filter, a lower storage portion disposed under the filter support portion, the lower storage portion communicating with the interior of the filter through the open bottom of the filter, and an upper storage portion disposed on the filter support portion, the upper storage portion being separated from the lower storage portion by the filter support portion and being in contact with the outer surface of the filter.

The circulation passage may be connected to the lower storage portion.

The wash pump may be connected to the upper storage portion.

The dishwasher may further include a drain unit connected to the lower storage portion, the drain unit being configured to discharge wash water stored in the sump therefrom.

The dishwasher may further include a supply passage configured to guide wash water, supplied by the wash pump, to the spray arm. The circulation passage may be branched from the supply passage.

The dishwasher may further include a supply passage configured to guide wash water, supplied by the wash pump, to the spray arm, and a flow-switching unit configured to selectively open or close the supply passage and the circulation passage.

The flow-switching unit may include a flow-switching plate having therein at least one opening for opening the supply passage and the circulation passage, and a flow-switching motor configured to rotate the flow-switching plate.

The supply passage and the circulation passage may be opened simultaneously or selectively depending on rotation of the flow-switching plate.

The flow-switching unit may be a valve configured to selectively open the supply passage and the circulation passage.

The sump may further include a sump cover configured to separate the upper storage portion from the tub, the sump cover having therein a plurality of collection holes for collecting wash water sprayed into the tub therein.

The filter may include a mesh member extending into the sump through the sump cover and seated on the filter support portion, the mesh member being configured to remove foreign substances from wash water, and a core member covering the top of the mesh member, the core member being configured to remove foreign substances from wash water that flows to the mesh member from the region above the sump cover.

The filter may further include at least one support rib for supporting the mesh member so that the shape of the mesh member is maintained constant.

The filter may have an open bottom and may extend to the bottom surface of the sump.

The circulation passage may penetrate the bottom surface of the sump and may communicate with the interior of the filter.

The dishwasher may further include a drain unit for discharging wash water stored in the sump therefrom. The drain unit may penetrate the bottom surface of the sump and may communicate with the interior of the filter.

In another aspect of the present invention, there is provided a method of controlling a dishwasher including a tub for accommodating dishes, a spray arm for spraying wash water toward the dishes, a sump for storing wash water, a filter provided inside the sump in order to remove foreign substances from wash water, and a wash pump for supplying wash water stored in the sump to the spray arm.

The method includes washing the dishes by supplying wash water to the spray arm, collecting foreign substances present in wash water in the interior of the filter by diverting all of wash water that is introduced into the wash pump to the interior of the filter, the collecting being performed after the washing is completed, and discharging foreign substances collected in the interior of the filter outside along with wash water.

The wash water supplied to the interior of the filter may pass through the filter due to the operation of the wash pump.

The washing may include supplying wash water to the spray arm by operating the wash pump, and diverting at least a portion of wash water that is supplied to the spray arm to the interior of the filter.

The method may further include measuring the degree of contamination of wash water. The amount of wash water that is diverted to the interior of the filter in the washing may be proportional to the measured degree of contamination of wash water.

When the measured degree of contamination of wash water is equal to or greater than a predetermined value, all of wash water that is introduced into the wash pump may be diverted to the interior of the filter.

The method may further include measuring the degree of contamination of wash water. The collecting may be performed until the measured degree of contamination of wash water becomes equal to or less than a predetermined value.

The wash pump may be operated at a first number of revolutions per minute (RPM) in the washing, and may be operated at a second RPM in the collecting, the second RPM being greater than the first RPM.

In a further aspect of the present invention, a method of controlling a dishwasher includes supplying wash water to the spray arm by operating the wash pump, diverting at least a portion of wash water that is supplied to the spray arm to the interior of the filter, and collecting foreign substances present in wash water in the interior of the filter by diverting all of wash water that is introduced into the wash pump to the interior of the filter.

The wash water supplied to the interior of the filter may pass through the filter due to the operation of the wash pump and may move to the exterior of the filter.

The wash pump may be rotated at a higher speed in the collecting than in the diverting.

The method may further include discharging foreign substances collected in the interior of the filter outside along with wash water.

The supplying, the diverting and the collecting may be performed in at least one of a preliminary washing process of soaking foreign substances by spraying water toward the dishes, a washing process of removing foreign substances by spraying water and detergent toward the dishes, a rinsing process of removing foreign substances and detergent remaining on the dishes by spraying water toward the dishes, or a heating-rinsing process of spraying heated water toward the dishes.

Advantageous Effects

According to the present invention, a dishwasher is capable of diverting some or all of wash water that is supplied to a spray arm to the interior of a filter. The wash water supplied to the interior of the filter passes through the filter, at which time foreign substances are collected in the filter. Accordingly, it is possible to prevent foreign substances separated from an object to be washed from being again sprayed along with the wash water toward the object to be washed.

In addition, after the spraying of wash water is completed, all of the wash water stored in a sump is diverted to the interior of the filter, whereby foreign substances present in the sump are collected in the filter. Accordingly, it is possible to discharge most foreign substances along with the wash water in a draining process and to minimize the amount of foreign substances that remain in the sump after the draining process. In addition, it is possible to separate foreign substances from the outer circumferential surface of the filter through the aforementioned circulation process and consequently to prevent foreign substances from accumulating on the filter.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
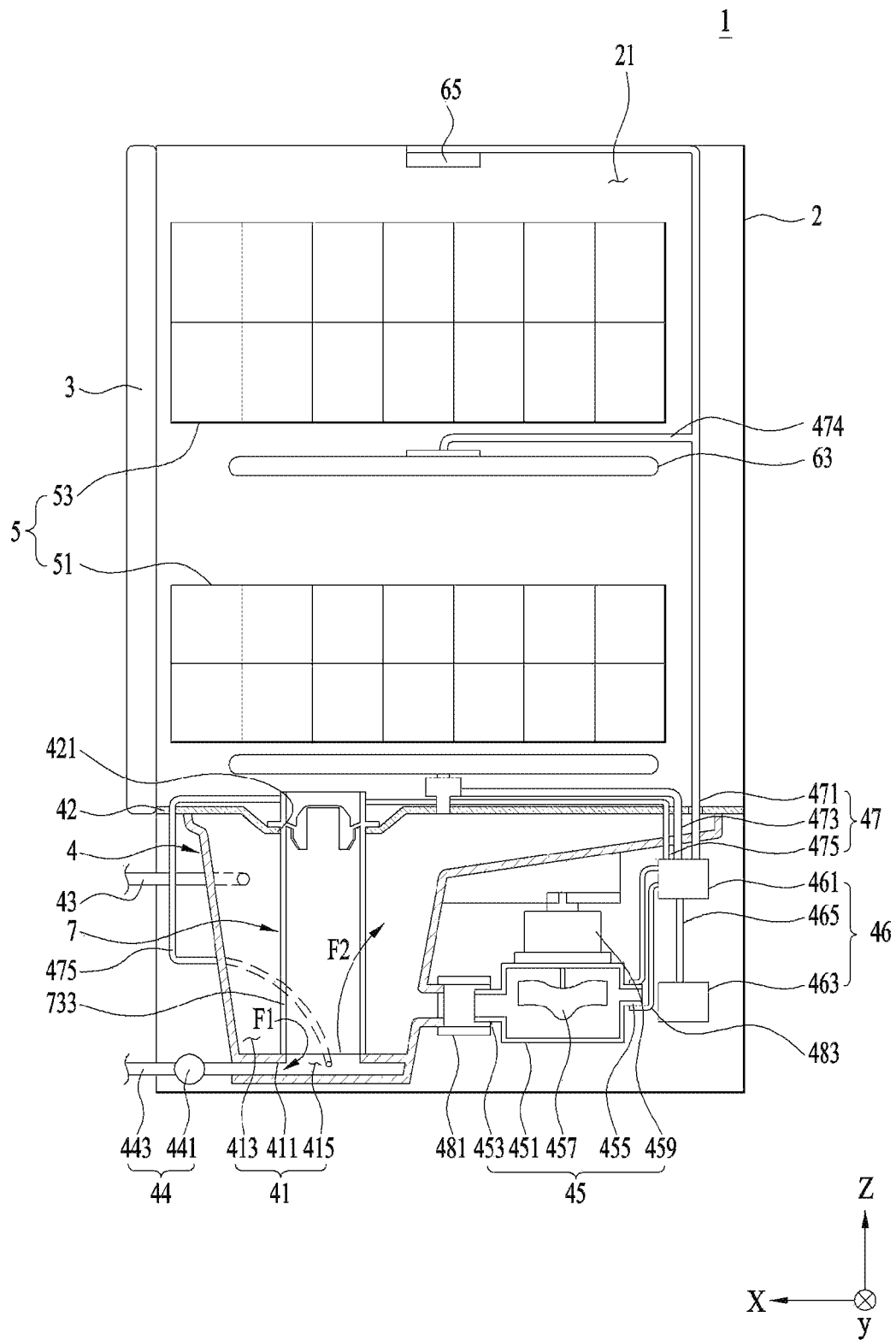
FIG. 1 is a cross-sectional view of a dishwasher according to an embodiment of the present invention.

Reference will now be made in detail to the preferred embodiments of the present invention, examples of which are illustrated in the accompanying drawings. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear.

Additionally, terms such as "first", "second", "A", "B", "(a)", "(b)", etc. may be used herein to describe the components of the embodiments of the present invention. These terms are only used to distinguish one element from another element, and the essence, order, or sequence of corresponding elements are not limited by these terms. It should be noted that if it is described in the specification that one component is "connected", "coupled", or "joined" to another component, the former may be directly "connected", "coupled", or "joined" to the latter, or may be "connected", "coupled", or "joined" to the latter via another component.

Hereinafter, the present invention will be described in detail with reference to the accompanying drawings.

Figure 2:
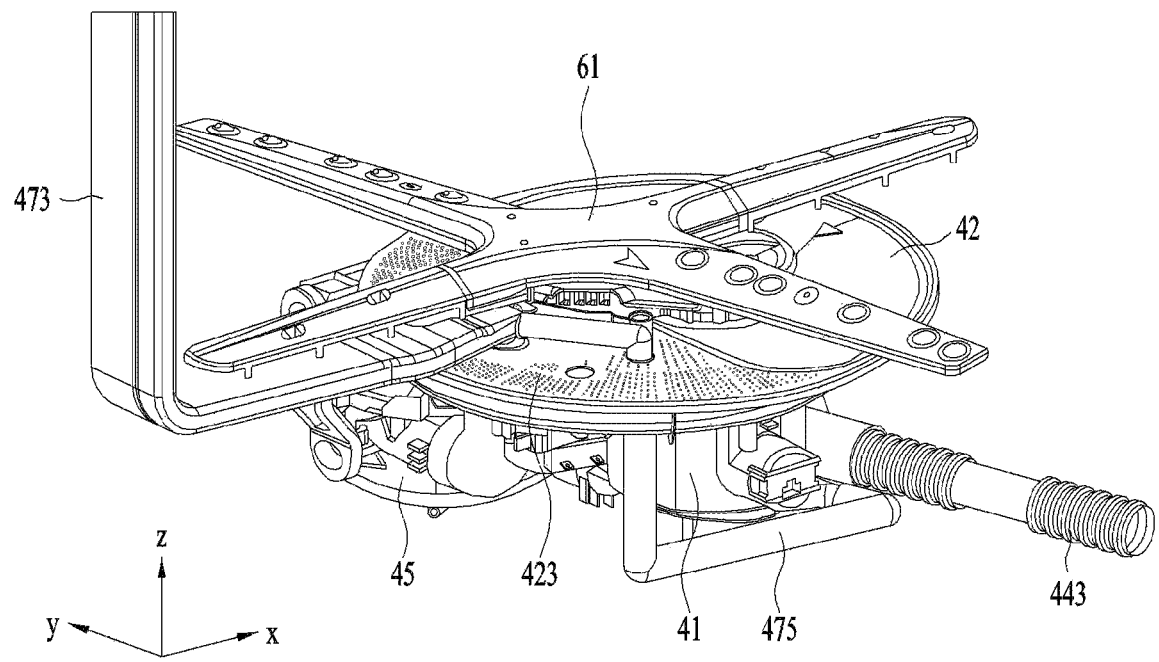
FIGS. 2 and 3 are, respectively, a perspective view and a side view of a sump and a lower spray arm depicted in FIG. 1.
Figure 3:
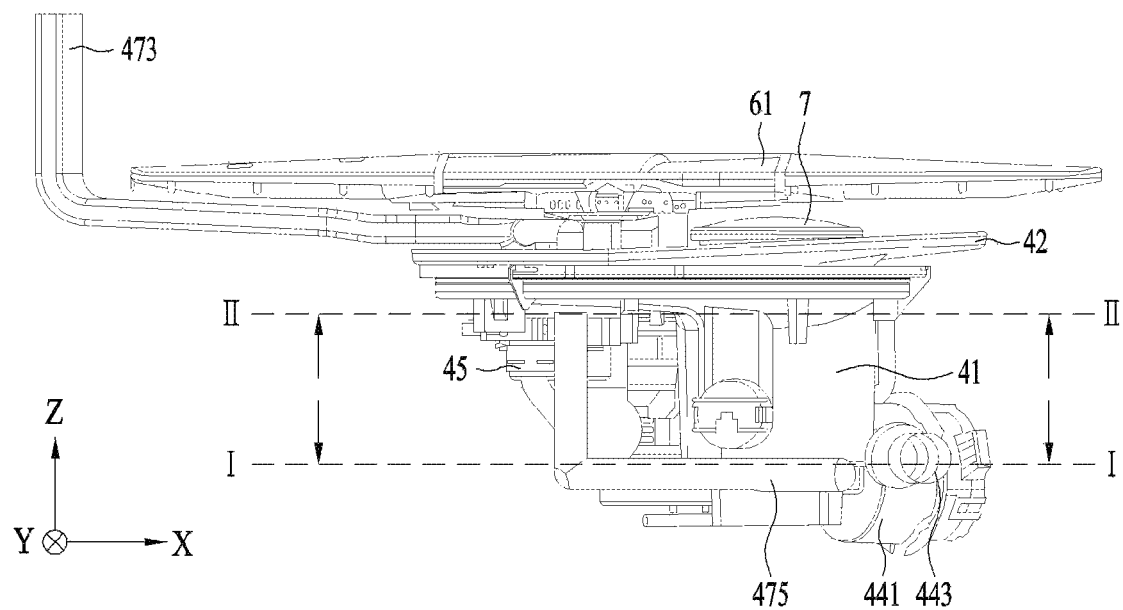
Figure 4:
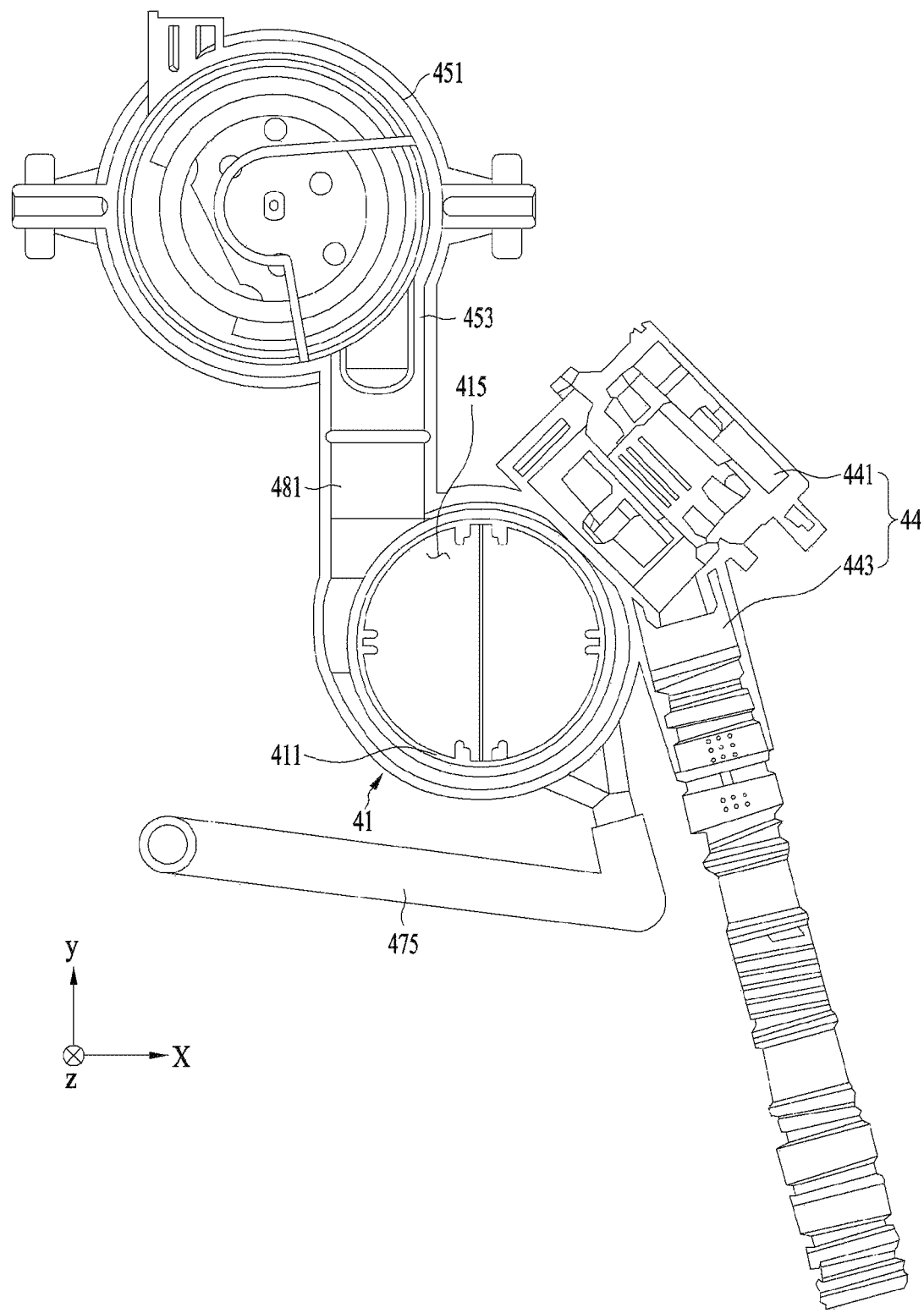
FIG. 4 is a cross-sectional view taken along line I-I in the sump depicted in FIG. 3.
Figure 5:
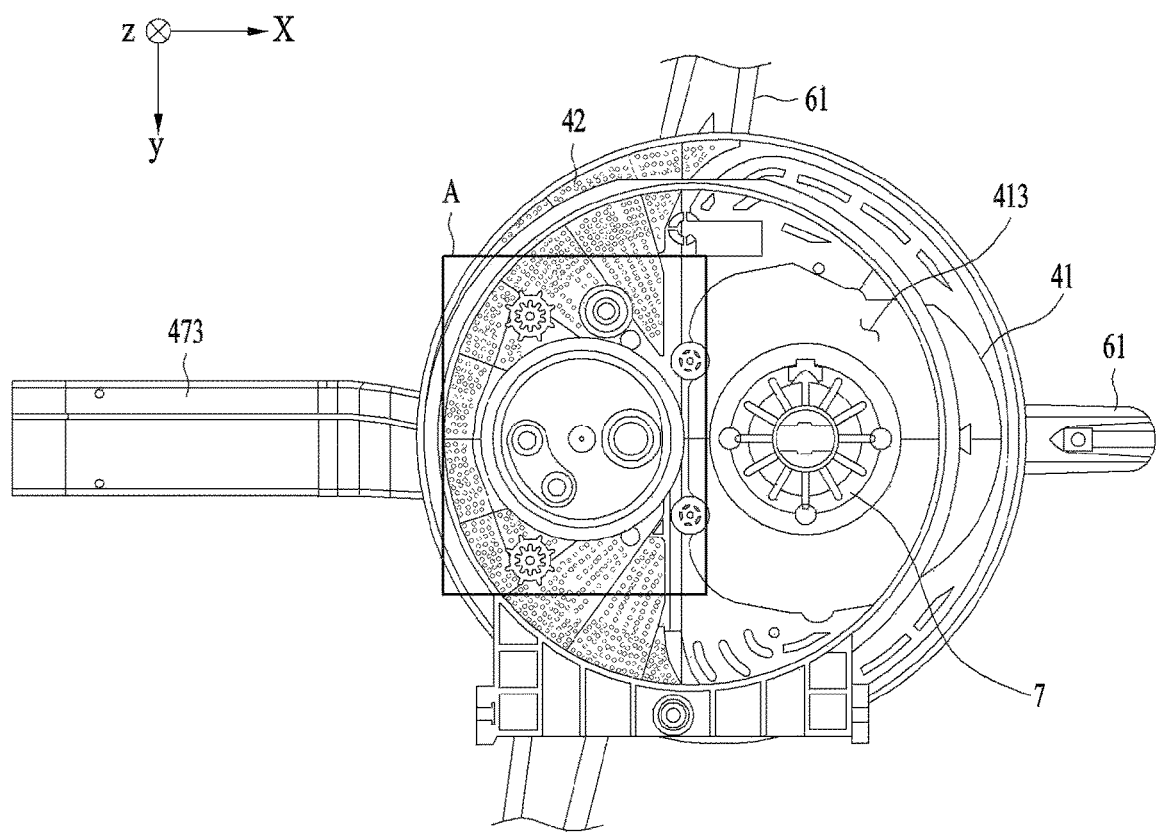
FIG. 5 is a cross-sectional view taken along line II-II in the sump depicted in FIG. 3.
Figure 6:
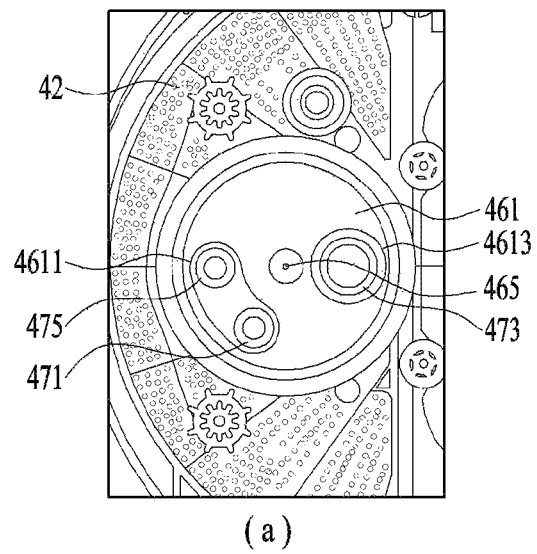
FIG. 6 is an enlarged view of portion "A" in FIG. 5.
Figure 6:
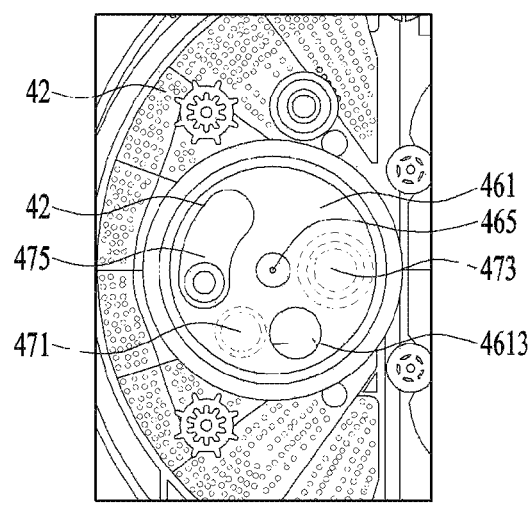

FIG. 1 is a cross-sectional view of a dishwasher. FIGS. 2 and 3 are, respectively, a perspective view and a side view of a sump and a lower spray arm depicted in FIG. 1. FIG. 4 is a cross-sectional view taken along line I-I in the sump depicted in FIG. 3. FIG. 5 is a cross-sectional view taken along line II-II in the sump depicted in FIG. 3. FIG. 6 is an enlarged view of portion "A" in FIG. 5.

Referring to FIGS. 1 to 6, a dishwasher 1 includes a housing forming the external appearance of the dishwasher, a tub 2 forming a washing compartment 21 inside the housing, a door 3 for selectively opening or closing the washing compartment 21, a sump 4 provided below the tub 2 to store wash water therein, a containing unit 5 provided inside the tub 2 to contain an object to be washed therein, a spray arm 6 for spraying wash water toward the object to be washed that is contained in the containing unit 5, and a filter assembly 7 for removing foreign substances from wash water.

The tub 2 forms the washing compartment 21, in which an object to be washed is placed. The containing unit 5 and the spray arm 6 may be accommodated in the washing compartment 21. The tub 2 may have one open surface, and the open surface of the tub 2 may be opened or closed by the door 3.

The door 3 may be rotatably connected to the housing, and may selectively open or close the washing compartment 21. For example, the door 3 may be coupled to the lower portion of the housing via a hinge. In this case, the door 3 may open or close the tub 2 by rotating about the hinge. When the door 3 is open, the containing unit 5 may be withdrawn out of the dishwasher 1, and the containing unit 5 withdrawn outside may be supported by the door 3.

The sump 4 may include a storage unit 41 for storing wash water, a sump cover 42 for separating the storage unit 41 from the tub 2, a water supply unit 43 for supplying water to the storage unit 41, a drain unit 44 for discharging water outside from the storage unit 41, and a wash pump 45 and a flow passage unit 47 for supplying the water stored in the storage unit 41 to the spray arm 6.

The filter assembly 7 for removing foreign substances from wash water may be accommodated in the storage unit 41. At this time, the filter assembly 7 may be supported by a filter support portion 411.

The storage unit 41 may be divided into an upper storage portion 413 and a lower storage portion 415 on the basis of the filter support portion 411. As shown in FIG. 1, the upper storage portion 413 may be in contact with the outer circumferential surface of the filter assembly 7, and the lower storage portion 415 may communicate with the interior of the filter assembly 7. When the wash water in the upper storage portion 413 moves to the lower storage portion 415, as indicated by the arrow F1, the wash water passes through a mesh member 733 (refer to FIG. 7) of the filter assembly 7. In the same way, when the wash water in the lower storage portion 415 moves to the upper storage portion 413, as indicated by the arrow F2, the wash water passes through the mesh member 733 of the filter assembly 7.

The upper storage portion 413 may be connected with the water supply unit 43 and the wash pump 45, and the lower storage portion 415 may be connected with the drain unit 44 and a circulation passage 475. Through this component connection structure, foreign substances present in wash water may collect on the mesh member 733 of a filter 73. A detailed description thereof will be made later.

Alternatively, the filter support portion 411 may not be provided inside the sump 4, and the mesh member 733 may extend to the bottom surface of the storage unit 41. In this case, the circulation passage 475 and the drain unit 44 may penetrate the bottom surface of the storage unit 41 and may communicate with the internal space in the mesh member 733.

The sump cover 42 may be provided on the sump 4 and may separate the tub 2 and the sump 4 from each other. The sump cover 42 may have therein a through-hole 421 for mounting the filter assembly 7 thereto and a plurality of collection holes 423 (refer to FIG. 2) for collecting the wash water, which was sprayed from the spray arm 6 to the washing compartment 21. The wash water sprayed from the spray arm 6 may drop to the lower portion of the washing compartment 21 and may collect in the storage unit 41 of the sump 4 via the filter assembly 7 and the collection holes 423.

The water supply unit 43 may be connected to an external water source and may supply water to the storage unit 41. At this time, in order to prevent the wash water or foreign substances in the storage unit 41 from moving back to the water supply unit 43, it is desirable for the water supply unit 43 to be connected to the upper portion of the storage unit 41. As shown in FIG. 1, in this embodiment, the water supply unit 43 is connected to the upper portion of the storage unit 41 and supplies water to the upper storage portion 413.

The drain unit 44 may include a drain pump 441 and a drain passage 443 and may discharge the wash water in the storage unit 41 outside the dishwasher 1. When the drain pump 441 operates, the wash water in the storage unit 41 is discharged outside through the drain passage 443.

After a washing process is performed, foreign substances such as food waste or the like may be included in the water collected in the storage unit 41. Therefore, if not all of the water in the storage unit 41 is discharged, it may lead to the propagation of bacteria, poor sanitation, and bad smells. In order to prevent this problem, it is desirable to connect the drain unit 44 to the lower portion of the storage unit 41.

Further, foreign substances such as food waste or the like may be discharged along with wash water during a draining process. At this time, the foreign substances may block the drain unit 44. As shown in FIGS. 1 and 4, in this embodiment, the drain passage 443 is connected to the lower storage portion 415. Because the lower storage portion 415 communicates with the interior of the filter assembly 7, relatively large foreign substances may be filtered out by the filter assembly 7. Accordingly, it is possible to prevent the drain unit 44 from being blocked by foreign substances present in wash water.

The wash pump 45 may supply the wash water stored in the storage unit 41 to the spray arm 6. In addition, the wash pump 45 may supply the wash water stored in the storage unit 41 to the circulation passage 475 so that the wash water flows back to the storage unit 41.

One end of the wash pump 45 may be connected to the upper storage portion 413, and the other end of the wash pump 45 may be connected to a flow-switching unit 46. A connection pipe 48 may be provided to connect the storage unit 41, the wash pump 45 and the flow-switching unit 46 to each other as needed.

The wash pump 45 may include a housing 451, in which an impeller 457 is provided, an inlet port 453 connected with the storage unit 41, an outlet port 455 connected with the flow-switching unit 46, and a motor 459 for rotating the impeller 457.

When power is supplied to the motor 459, the impeller 457 may be rotated, and the wash water in the storage unit 41 may be supplied to the flow passage unit 47 via the flow-switching unit 46.

The flow passage unit 47 may include a first supply passage 471 connected to a lower spray arm 61, a second supply passage 473 connected to an upper spray arm 63 and a top nozzle 65, and the circulation passage 475 connected to the storage unit 41. When the first supply passage 471 is opened, wash water may be supplied to the lower spray arm 61. When the second supply passage 473 is opened, wash water may be supplied to the upper spray arm 63 and the top nozzle 65. In addition, when the circulation passage 475 is opened, wash water may be supplied back to the storage unit 41.

As shown in FIGS. 1 and 4, the circulation passage 475 may be connected to the lower storage portion 415. That is, the wash water that circulates through the circulation passage 475 may be supplied to the lower storage portion 415, and may then move in the direction indicated by the arrow F2. In this process, foreign substances present in the wash water may collect on the inner surface of the mesh member 733.

The flow-switching unit 46 may selectively or simultaneously open the first and second supply passages 471 and 473 and the circulation passage 475. The flow-switching unit 46 may be embodied by a valve, a rotary plate, or the like. The flow-switching unit 46 may have various other configurations, as long as it can distribute wash water to various passages. For example, the flow-switching unit 46 may be an electronically controlled switch valve. In this case, the supply passages 471 and 473 and the circulation passage 475 may be selectively opened or closed by controlling the switch valve.

Hereinafter, the case in which the flow-switching unit 46 has a rotary-plate configuration will be described in detail.

As shown in FIGS. 1 and 5, the flow-switching unit 46 may include a flow-switching plate 461, having therein a plurality of openings 4611 and 4613, and a flow-switching motor 463 for rotating the flow-switching plate 461 via a rotary shaft 465. The flow-switching plate 461 may be rotated by the flow-switching motor 463, and the first and second supply passages 471 and 473 and the circulation passage 475 may be selectively opened or closed depending on the location of the flow-switching plate 461.

For example, when the flow-switching plate 461 moves to the location shown in FIG. 6(*a*), the first supply passage 471, the second supply passage 473 and the circulation passage 475 may be opened simultaneously. In this case, the wash water in the storage unit 41 may be supplied to the spray arms 61, 63 and 65, and a portion of the wash water may be diverted to the lower storage portion 415 through the circulation passage 475.

The wash water supplied to the lower storage portion 415 through the circulation passage 475 may move in the direction indicated by the arrow F2. In this process, foreign substances present in the wash water may collect on the inner circumferential surface of the mesh member 733. The wash water, from which foreign substances have been removed, may move to the upper storage portion 413, and may then be supplied to the spray arm 6 via the wash pump 45. Therefore, it is possible to prevent an object to be washed from being recontaminated with foreign substances present in wash water.

The foreign substances, which have been removed from wash water, may accumulate on the outer circumferential surface of the mesh member 733. The foreign substances accumulated on the outer circumferential surface of the mesh member 733 may hinder the flow of wash water, and may deteriorate the filtering performance of the mesh member 733. However, the wash water circulating through the circulation passage 475 moves from the interior of the mesh member 733 to the exterior of the mesh member 733 in the direction indicated by the arrow F2, thereby separating the foreign substances from the outer circumferential surface of the mesh member 733. That is, it is also possible to obtain an effect of removing foreign substances accumulated on the outer circumferential surface of the mesh member 733 using the circulation of wash water.

When the flow-switching plate 461 moves to the location shown in FIG. 6(*b*), only the circulation passage 475 may be opened. That is, the first supply passage 471 and the second supply passage 473 may be closed, and wash water may not be supplied to the spray arm 6. In this case, all of the wash water that is supplied from the wash pump 45 to the flow-switching unit 46 is supplied to the lower storage portion 415 through the circulation passage 475. The wash water supplied to the lower storage portion 415 through the circulation passage 475 may move in the direction indicated by the arrow F2. In this process, foreign substances present in the wash water may collect on the inner circumferential surface of the mesh member 733.

Unlike the state described above with reference to FIG. 6(*a*), in the state in which the flow-switching plate 461 is located as shown in FIG. 6(*b*), all of the wash water that is supplied from the upper storage portion 413 to the flow-switching unit 46 may return into the upper storage portion 413 via the circulation passage 475 and the mesh member 733. Therefore, the amount of foreign substances present in the wash water, which is stored in the upper storage portion 413, may be rapidly reduced. In addition, the foreign substances accumulated on the outer circumferential surface of the mesh member 733 may also be removed more rapidly.

It is illustrated in FIGS. 5 and 6 that the first opening 4611 has a size capable of opening both the first supply passage 471 and the circulation passage 475 at the same time and that the second opening 4613 is smaller than the first opening 4611. However, this is merely illustrative, and the present invention is not limited thereto. For example, the flow-switching plate 461 may have therein three openings, each of which corresponds to a respective one of the supply passages 471 and 473 and the circulation passage 475.

Although it is illustrated in FIGS. 5 and 6 that the circulation passage 475 is formed separately from the supply passages 471 and 473, the present invention is not limited thereto. For example, the circulation passage 475 may be branched from the first supply passage 471 or from the second supply passage 473. In this case, when the first supply passage 471 is opened, a portion of the wash water that is supplied to the lower spray arm 61 is always diverted to the sump 4 through the circulation passage 475. When the second supply passage 473 is opened, a portion of the wash water that is supplied to the upper spray arm 63 and the top nozzle 65 is always diverted to the sump 4 through the circulation passage 475.

At least one containing unit 5 for containing an object to be washed may be provided inside the washing compartment 21. Although it is illustrated in FIG. 1 that the dishwasher 1 is provided with two containing units, the present invention is not limited thereto. For example, the dishwasher 1 may include a single containing unit, or may include three or more containing units. In this case, the number of spray arms may vary depending on the number of containing units. Hereinafter, an explanation of the dishwasher 1 having two containing units will be made for convenience of description.

The containing unit 5 may include a lower rack 51 and an upper rack 52, which are configured to contain an object to be washed. The lower rack 51 may be disposed above the sump 4, and the upper rack 53 may be disposed above the lower rack 51. The lower rack 51 and the upper rack 53 may be withdrawn outside through the open surface of the tub 2. To this end, the tub 2 may be provided on the inner circumferential surface thereof with rails (not shown), and the racks 51 and 53 may be provided at the lower portions thereof with wheels. A user can place an object to be washed in the containing unit 5, or can take an object to be washed, which has been completely washed, out of the containing unit 5 by withdrawing the containing unit 5 outside.

The spray arm 6 may be provided inside the tub 2 in order to spray wash water toward an object to be washed placed in the containing unit 5.

The spray arm 6 may include the lower spray arm 61, the upper spray arm 63, and the top nozzle 65. The lower spray arm 61 may be rotatably mounted on the sump cover 42 in order to spray wash water toward an object to be washed contained in the lower rack 51. The upper spray arm 63 may be disposed above the lower spray arm 61 in order to spray wash water toward an object to be washed contained in the upper rack 53. The top nozzle 65 may be disposed at the top of the washing compartment 21 in order to spray wash water toward the lower rack 51 and the upper rack 53. As described above, the first supply passage 471 may supply wash water to the lower spray arm 61, and the second supply passage 473 may supply wash water to the upper spray arm 63 and the top nozzle 65.

The filter assembly 7 may be removably mounted to the sump 4 through the through-hole 421 formed in the sump cover 42. If a large amount of foreign substances accumulates in the filter assembly 7 due to repetition of the washing process, a user can separate the filter assembly 7 from the sump 4 and can remove foreign substances from the filter assembly 7. Hereinafter, the configuration of the filter assembly 7 will be described in detail with reference to FIGS. 7 and 8.

Figure 7:
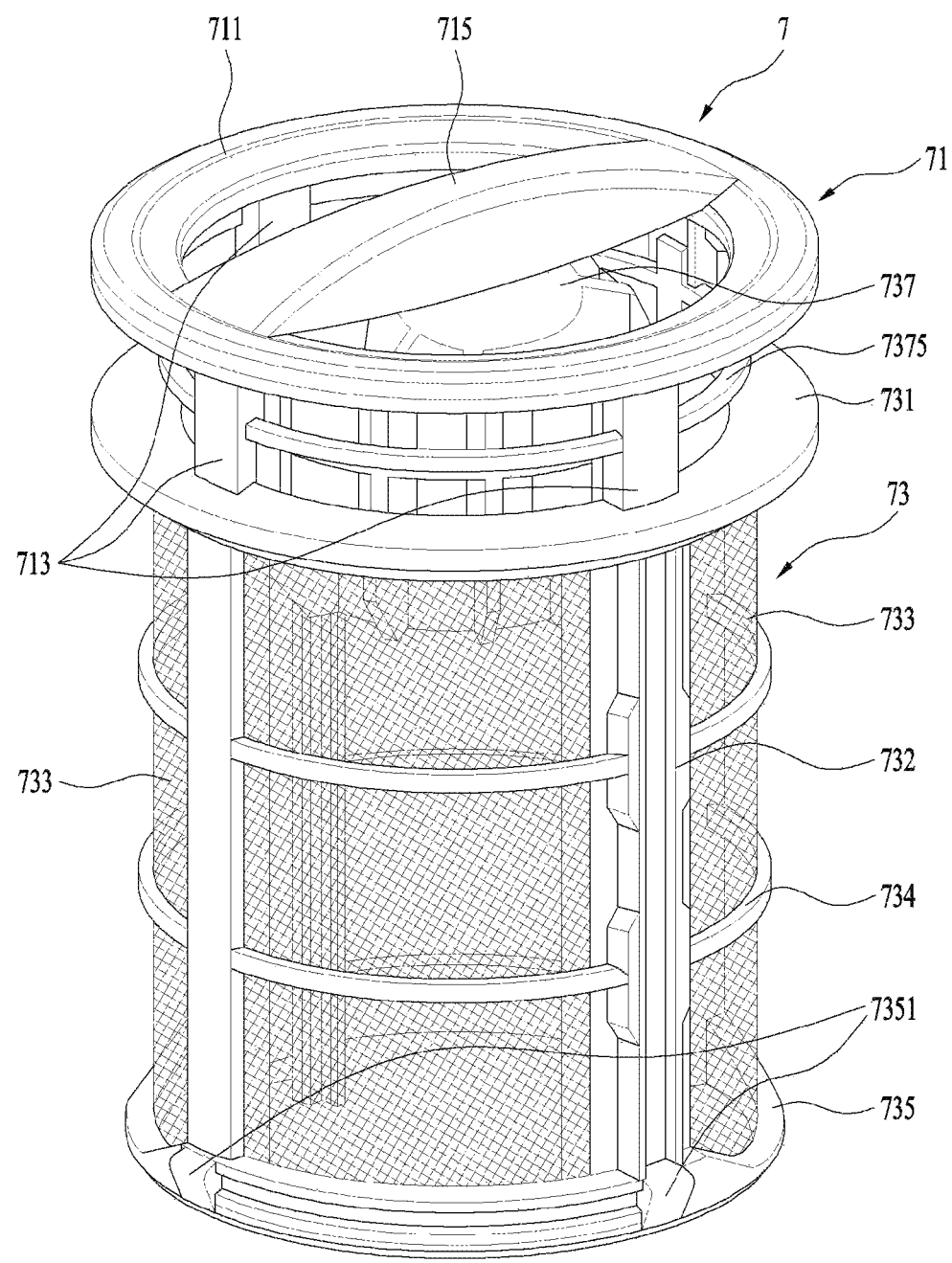
FIGS. 7 and 8 are views illustrating a filter assembly depicted in FIG. 1.
Figure 8:
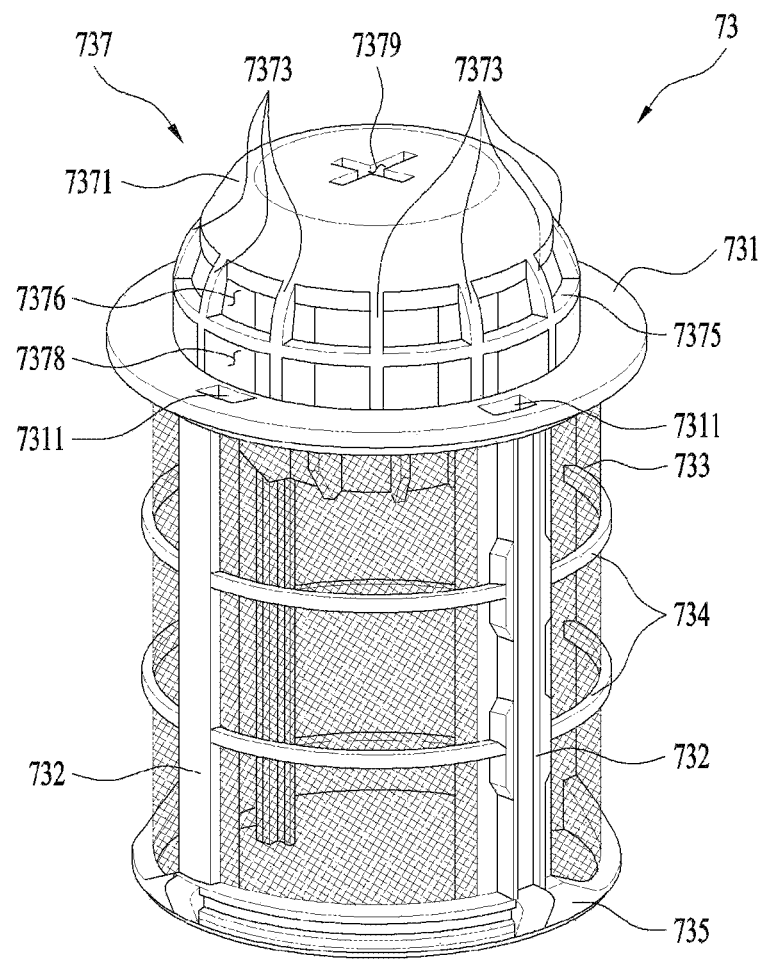
Figure 8:
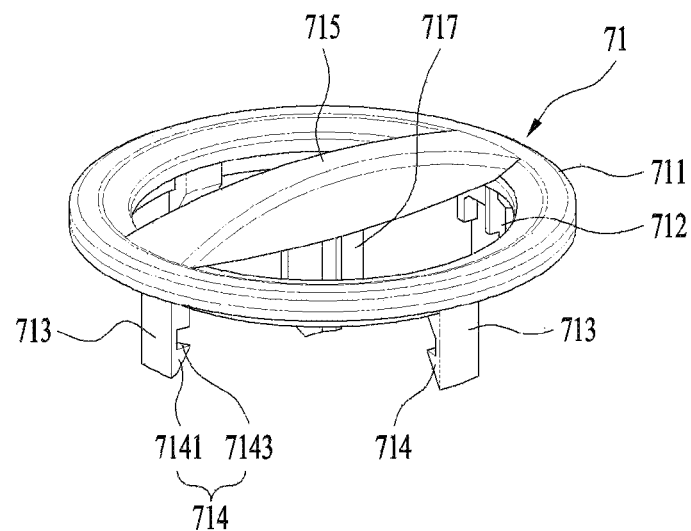

FIGS. 7 and 8 are views illustrating the filter assembly depicted in FIG. 1.

Referring to FIGS. 7 and 8, the filter assembly 7 may include the filter 73, which is inserted into the sump 4 in order to filter out foreign substances, and a handle member 71, which is coupled to the top of the filter 73. The handle member 71 is provided to facilitate mounting and demounting of the filter 73. The handle member 71 may be omitted as needed.

Although it is illustrated in FIG. 8 that the handle member 71 is separably coupled to the filter 73, the present invention is not limited thereto. For example, the handle member 71 and the filter 73 may be formed integrally with each other.

The filter 73 may include a seat portion 731, which is seated on a portion of the sump cover 42 around the through-hole 421, the mesh member 733, which extends downwards from the seat portion 731 in order to remove foreign substances from the wash water stored in the storage unit 41, a support rib 732, which extends downwards from the seat portion 731 in order to support the mesh member 733, a support rim 735, which is provided at the lower end of the support rib 732 and is seated on the filter support portion 411, and a core member 737, which is provided on the seat portion 731 in order to remove foreign substances from the wash water that flows to the mesh member 733 from the region above the sump cover 42.

The seat portion 731 may have therein an insertion hole 7311 for fixing the handle member 71. An extension rib 713 of the handle member 71 may be inserted into the insertion hole 7311. The shape and number of insertion holes 7311 may be set so as to correspond to the shape and number of extension ribs 713.

The support rib 732 may be inserted into the sump 4, and may support the mesh member 733 so that the shape of the mesh member 733 can be maintained constant. In order to support the mesh member 733 more securely, there may be further provided a reinforcement ring 734, which is formed so as to intersect with the support rib 732. At this time, the number of support ribs 732 and the number of reinforcement rings 734 may be set properly depending on the size and material of the mesh member 733.

The support rim 735 may be in contact with the filter support portion 411 of the sump 4, and may support the filter 73. That is, the filter 73 may be securely fixed inside the sump 4 in a manner such that the seat portion 731 and the support rim 735 are in contact with the sump cover 42 and the filter support portion 411, respectively. Accordingly, even when wash water moves inside the sump 4, the filter 73 may be prevented from being moved.

In addition, although not illustrated, in order to fix the filter 73 to the sump 4 more securely, the support rim 735 may be provided at the bottom or the side portion thereof with a fastening member. For example, the filter support portion 411 may be provided with a fastening hole (not shown) having therein threads, and the fastening member, which is inserted into the fastening hole, may be provided at the bottom of the support rim 735. The fastening member may also have threads formed in the outer surface thereof. The fastening member may be inserted into the fastening hole and may be rotated so as to be securely engaged with the fastening hole. Accordingly, it is possible to fix the filter 73 to the sump 4 more securely.

The mesh member 733 may be mounted between the seat portion 731 and the support rim 735 and may remove foreign substances from wash water. Since the mesh member 733 is mounted in a cylindrical shape along the support rib 732 and the reinforcement ring 734, the top and bottom of the mesh member 733 may be open. The top of the mesh member 733 may be covered with the core member 737, and the bottom of the mesh member 733 may communicate with the lower storage portion 415. This is illustrated in FIG. 1.

When wash water moves into the filter 73 from the exterior of the filter 73, foreign substances present in the wash water may collect on the outer circumferential surface of the mesh member 733. Conversely, when wash water moves out of the filter 73 from the interior of the filter 73, foreign substances present in the wash water may collect on the inner circumferential surface of the mesh member 733.

Specifically, as shown in FIG. 1, the wash water that is supplied into the filter 73 through the core member 737 and the circulation passage 475 may pass through the mesh member 733 in the direction indicated by the arrow F2. Accordingly, foreign substances present in the wash water may be caught on the inner circumferential surface of the mesh member 733, and the wash water, from which foreign substances have been removed, may be supplied to the spray arm 6 through the wash pump 45.

The wash water sprayed from the spray arm 6 may be introduced into the storage unit 41 through the core member 737, and may also be introduced into the storage unit 41 through the collection holes 423 formed in the sump cover 42. In this case, the wash water may be introduced into the upper storage portion 413. The wash water introduced into the upper storage portion 413 may pass through the mesh member 733 in the direction indicated by the arrow F1, and foreign substances present in the wash water may collect on the outer circumferential surface of the mesh member 733.

The core member 737 may cover the top of the mesh member 733 and may remove foreign substances from wash water.

As shown in FIG. 8(a), the core member 737 may include a core 7371 provided above the seat portion 731 and a plurality of ribs interconnecting the core 7371 and the seat portion 731. The ribs may include radial ribs 7373 and reinforcement ribs 7375, which intersect with each other. The core 7371, the radial ribs 7373 and the reinforcement ribs 7375 may define first and second holes 7376 and 7378 therebetween, which communicate with the interior of the filter 73. Wash water may be introduced into the filter 73 through the first and second holes 7376 and 7378. At this time, stick-type foreign substances such as toothpicks or the like may be filtered out.

The core 7371 may have a guide hole 7379 formed in the top thereof, into which a guide rib 717 of the handle member 71 is fitted.

The handle member 71 may include a ring-shaped body 711, a plurality of extension ribs 713, which extend downwards from the body 711 and are coupled to the filter 73, and a handle 715, which is formed across the body 711. The handle member 71 may be separably coupled to the filter 73. A user can insert the filter 73 into the sump 4 or take the filter 73 out of the sump 4 while grabbing the handle 715.

Each of the extension ribs 713 may be inserted into the insertion hole 7311 formed in the seat portion 731 of the filter 73. In order to prevent the extension rib 713 from being separated from the seat portion 731, the extension rib 713 may be provided at the lower end thereof with a hook 714. The hook 714 may include an inclined surface 7141, which extends at an incline from the lower end of the extension rib 713 toward the center of the body 711, and a latching surface 7143. When the hook 714 is inserted into the insertion hole 7311, the latching surface 7143 comes into contact with the bottom surface of the seat portion 731. Accordingly, the extension rib 713 may be fixed on the seat portion 731.

In order to adjust the depth to which the extension rib 713 is inserted into the insertion hole 7311, the body 711 may be provided with gap-maintaining protrusions 712. The gap-maintaining protrusions 712 protrude from the bottom surface of the body 711. When the handle member 71 is coupled to the seat portion 731, the gap-maintaining protrusions 712 may come into contact with the top surface of the seat portion 731, thereby preventing the extension rib 713 from being inserted into the insertion hole 7311 beyond a predetermined depth.

In addition, the handle 715 may be provided at the bottom surface thereof with the guide rib 717, which guides the coupling of the handle member 71 to the filter 73. The guide rib 717 may be inserted into the guide hole 7379 formed in the core member 737, whereby the handle member 71 can be coupled to the filter 73 in a correct direction.

As described above, the dishwasher 1 according to the embodiment of the present invention is capable of diverting some or all of the wash water that is supplied from the wash pump 45 to the sump 4. In particular, the diverted wash water is supplied to the interior of the filter 73, whereby foreign substances present in the wash water are filtered out inside the filter 73. In addition, when the diverted wash water passes through the filter 73, it can separate foreign substances from the outer surface of the filter 73. Accordingly, it is possible to prevent an object to be washed from being recontaminated with foreign substances present in wash water and to prevent the filter 73 from being blocked by foreign substances present in wash water.

Hereinafter, a method of washing dishes using the above-described dishwasher 1 will be described in detail.

Figure 9:
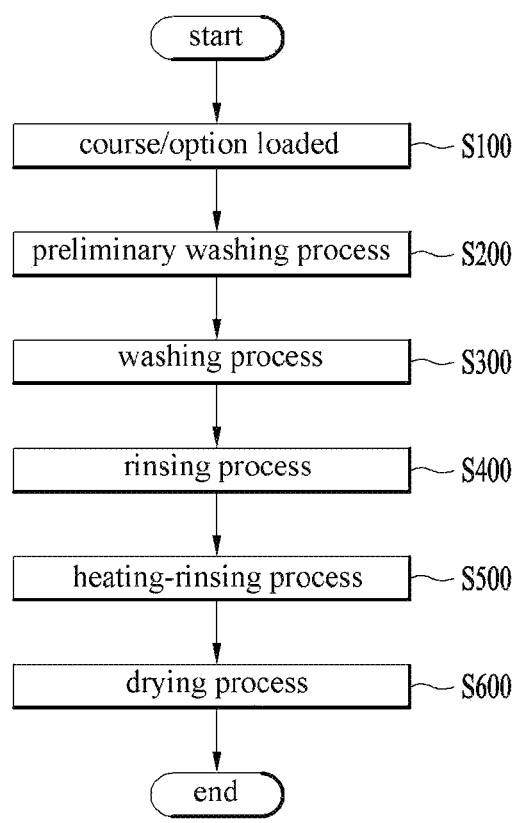
FIG. 9 is a flowchart for explaining a method of controlling the dishwasher depicted in FIG. 1.

FIG. 9 is a flowchart for explaining a method of controlling the dishwasher depicted in FIG. 1.

First, when power is applied to the dishwasher 1, at least one of a course or an option for washing dishes is loaded (S100).

Here, the course may include at least one selected from among a preliminary washing process (S200), a washing process (S300), a rinsing process (S400), a heating-rinsing process (S500), a drying process (S600), and combinations thereof. For example, a first course may be set to include the washing process and the rinsing process, and a second course may be set to include the preliminary washing process, the washing process, the rinsing process, the heating-rinsing process, and the drying process.

The preliminary washing process may be a process of spraying water toward an object to be washed that is accommodated in the washing compartment 21 and of soaking the same so as to easily remove foreign substances from the object to be washed.

The washing process may be a process of removing foreign substances from the object to be washed by spraying water and detergent toward the same.

The rinsing process may be a process of removing foreign substances and detergent remaining on the object to be washed by spraying water toward the same. At this time, a rinsing agent may be sprayed along with water in order to disinfect the object to be washed. In addition, the rinsing agent may serve to weaken the surface tension of the water on the surface of the object to be washed, thereby making the water run down easily and consequently shortening the time taken to dry the object to be washed.

The heating-rinsing process may be a process of heating the object to be washed by spraying water that was heated to a predetermined temperature toward the same so as to shorten the time taken to dry the object to be washed and to disinfect the same.

The drying process may be a process of removing moisture from the surface of the object to be washed. In this case, the object to be washed may be dried passively. Alternatively, a drying fan (not shown) may be operated in order to discharge the air in the tub 2 to the outside, thereby shortening the drying time.

The option may be the operating conditions under which each process of the selected course is operated. For example, the operating conditions may be information about the temperature of water that is supplied to the object to be washed in the heating-rinsing process, an operating time of the drying fan in the drying process, the number of repetitions of each process, or the like.

When power is applied to the dishwasher 1, information about the most-recently performed course and related options may be loaded, or information about the course that has been performed most frequently during a predetermined period and related options may be loaded. Alternatively, a user may directly input information about the course and the option. The loading type may be set variously depending on the user's selection.

Subsequently, according to the set course and option, at least one of the preliminary washing process (S200), the washing process (S300), the rinsing process (S400), the heating-rinsing process (S500), or the drying process (S600) is performed.

In all of the preliminary washing process (S200), the washing process (S300), the rinsing process (S400), and the heating-rinsing process (S500), wash water may be sprayed from the spray arm 6. The sprayed wash water may collect in the sump 4, and foreign substances, which were removed from the object to be washed, may be included in the collected wash water.

The present invention is capable of removing foreign substances present in wash water by diverting a portion of sprayed wash water to the interior of the filter 73 and of removing foreign substances accumulated on the outer circumferential surface of the filter 73 by diverting all of wash water stored in the sump 4 to the interior of the filter 73 after the process is completed. Therefore, the present invention can be applied in the same or a similar way to every process in which the spraying of wash water is performed.

Figure 11:
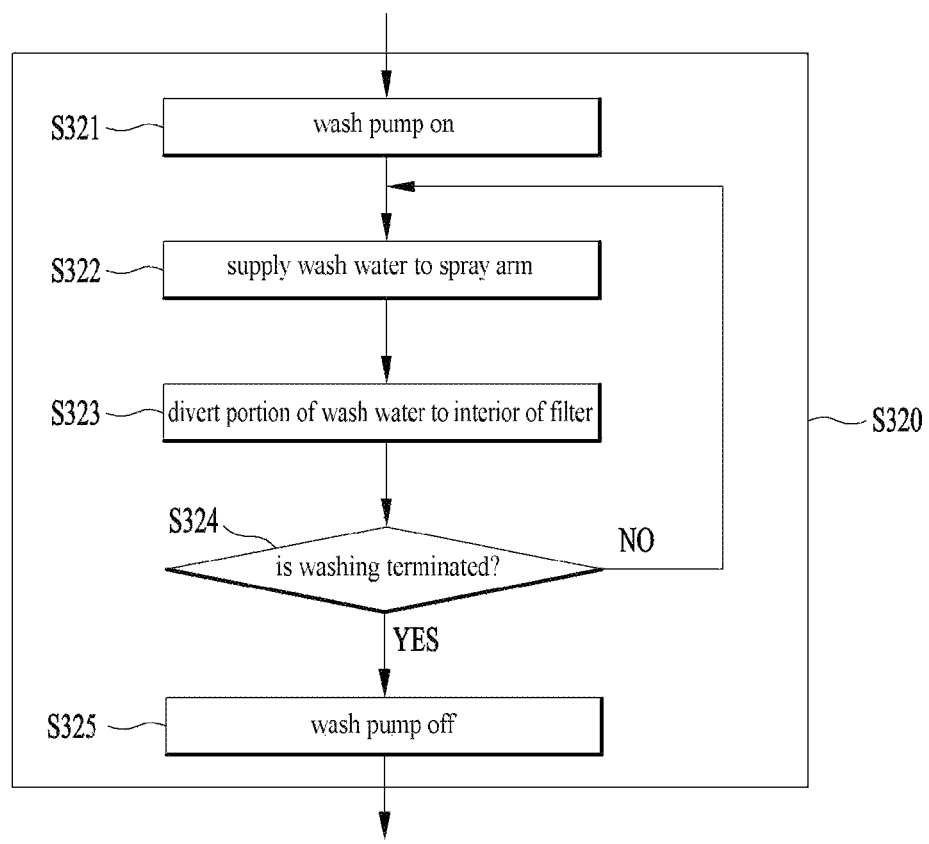
FIG. 11 is a flowchart showing a dish-washing step of FIG. 10.
Figure 12:
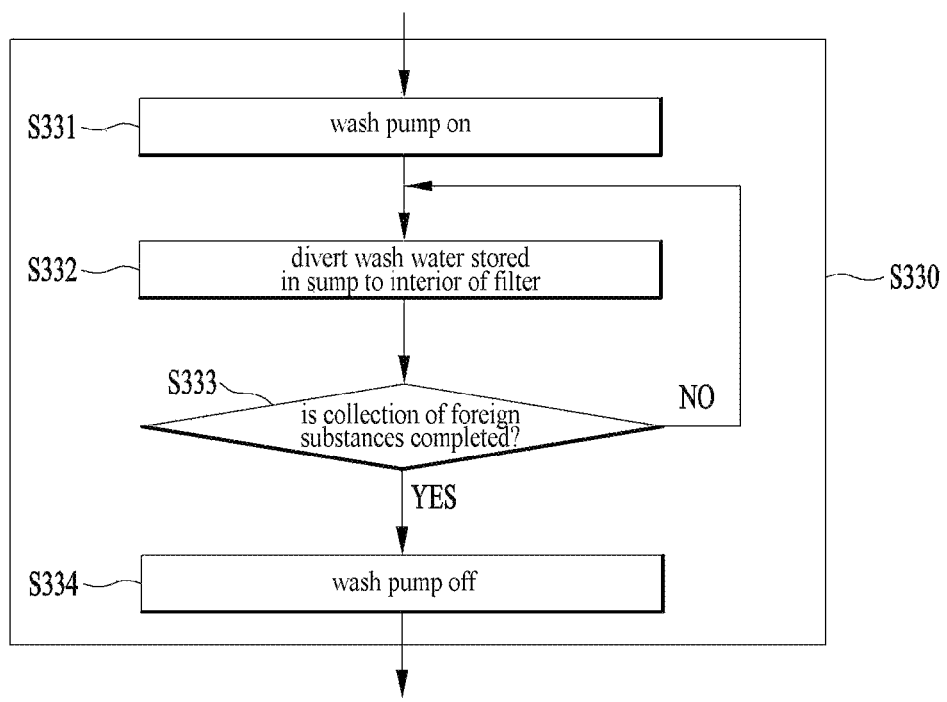
FIG. 12 is a flowchart showing a filter-washing step of FIG. 10.

For convenience of description, the washing process (S300), to which the present invention is applied, will now be described in detail with reference to FIGS. 10 to 12. However, the present invention should not be construed as being applied only to the washing process (S300). The present invention can be applied in the same or a similar way to every process in which wash water is sprayed toward an object to be washed.

Figure 10:
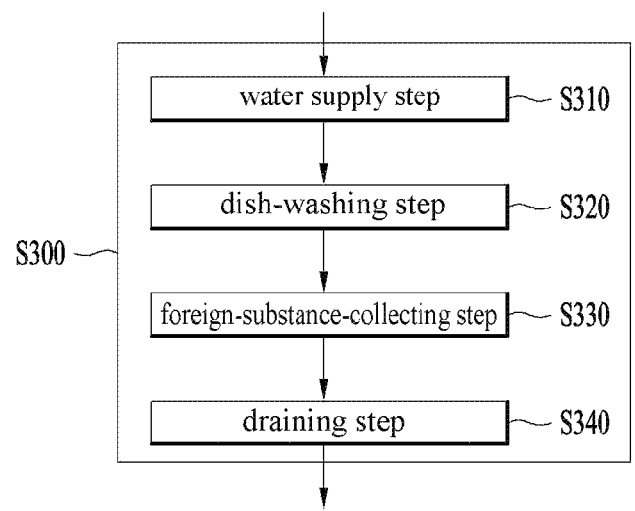
FIG. 10 is a flowchart showing a washing process of FIG. 9.

FIG. 10 is a flowchart showing the washing process of FIG. 9. FIG. 11 is a flowchart showing a dish-washing step of FIG. 10. FIG. 12 is a flowchart showing a filter-washing step of FIG. 10.

First, the water supply unit 43 supplies water to the interior of the sump 4 (S310). At this time, detergent or the like may be supplied along with the water in order to improve washing performance.

Dishes are washed using the water (hereinafter referred to as "wash water") stored in the sump 4 (S320).

For example, the wash water in the storage unit 41 is supplied to the flow-switching unit 46 by operating the wash pump 45 (S321). The flow-switching unit 46 may selectively open or close the first supply passage 471 and the second supply passage 473 according to the selected option and may supply the wash water to the spray arm 6 through the opened passage (S322). If the first supply passage 471 is opened, the wash water may be supplied to the lower spray arm 61. If the second supply passage 473 is opened, the wash water may be supplied to the upper spray arm 63 and the top nozzle 65.

The wash water supplied to the spray arm 6 is sprayed toward dishes contained in the containing unit 5. The sprayed wash water may collide with the dishes, may fall to the sump cover 42, and may collect in the upper storage portion 413 through the through-hole 421 and the collection holes 423. The wash water introduced into the through-hole 421 may collect in the interior of the filter 73 through the core member 737, and the wash water introduced into the collection holes 423 may collect in the exterior of the filter 73. Here, the interior of the filter 73 is a region that is contiguous with the inner circumferential surface of the mesh member 733, and the exterior of the filter 73 is a region that is contiguous with the outer circumferential surface of the mesh member 733.

The collected wash water may be again sprayed toward the dishes via the wash pump 45 and the spray arm 6 in that order. Through this circulation mechanism, wash water may be consistently sprayed toward the dishes.

As shown in FIG. 1, the wash pump 45 may be connected to the upper storage portion 413. Therefore, the wash water stored in the interior of the filter 73 may be moved to the exterior of the filter 73 in the direction indicated by the arrow F2, and may then be supplied to the wash pump 45. At this time, since the wash water passes through the mesh member 733 of the filter 73, foreign substances present in the wash water may collect on the inner circumferential surface of the mesh member 733.

On the other hand, the wash water stored in the exterior of the filter 73 may be directly introduced into the wash pump 45 without passing through the mesh member 733. Thus, the wash water, in which foreign substances are included, may be sprayed toward the dishes through the spray arm 6.

In order to prevent this, in the present invention, a portion of the wash water that is supplied to the spray arm 6 is diverted to the interior of the filter 73, thereby removing foreign substances from the wash water (S323).

Specifically, a portion of the wash water that is supplied from the wash pump 45 to the spray arm 6 is supplied to the storage unit 41 through the circulation passage 475. At this time, the flow-switching unit 46 may be controlled so as to open the circulation passage 475. For example, the flow-switching plate 461 may be rotated to the location shown in FIG. 6(*a*) by operating the flow-switching motor 463 so as to open the circulation passage 475.

As shown in FIG. 1, the circulation passage 475 is connected to the lower storage portion 415, which communicates with the interior of the filter 73. Therefore, the wash water supplied through the circulation passage 475 may pass through the mesh member 733 of the filter 73 in the direction indicated by the arrow F2, and foreign substances present in the wash water may collect on the inner circumferential surface of the filter 73. If this circulation is repeated while the wash water is sprayed, foreign substances present in the wash water may collect on the inner circumferential surface of the filter 73. Accordingly, the wash water, from which foreign substances have been removed, may be supplied to the spray arm 6, thereby preventing recontamination of the dishes.

In this case, the amount of wash water that is diverted to the interior of the filter 73 may be adjusted variously as needed. For example, a sensor (not shown) for measuring the contamination of wash water may be mounted in the sump 4, and the amount of wash water that is diverted may be controlled depending on the degree of contamination of the wash water. Particularly, when the contamination of wash water is severe, the supply of wash water to the spray arm 6 may be stopped for a predetermined time period, and all of the wash water that is introduced into the wash pump 45 may be diverted through the circulation passage 475.

After the spraying of wash water through the spray arm 6 is performed for a predetermined time period (S324), the operation of the wash pump 45 is stopped (S325) and the dish-washing step (S320) is terminated.

When the dish-washing step is terminated, the wash water stored in the storage unit 41 is discharged outside. At this time, foreign substances present in the wash water are also discharged outside along with the wash water. However, as shown in FIG. 1, because the lower storage portion 415, to which the drain passage 443 is connected, communicates with the interior of the filter 73, foreign substances present in the exterior of the filter 73 may not be discharged along with the wash water. That is, when the drain pump 441 is operated, the wash water stored in the exterior of the filter 73 moves to the drain passage 443 in the direction indicated by the arrow F1, and at this time, foreign substances present in the wash water may collect on the outer circumferential surface of the mesh member 733. Thus, the foreign substances collected on the outer circumferential surface of the mesh member 733 may not be discharged outside and may remain inside the sump 4. This may be a cause of recontamination of the dishes in the rinsing process (S300) that is subsequently performed. In addition, the filter 73 may be blocked, or may not perform its role normally due to the foreign substances accumulated on the mesh member 733.

In order to solve this problem, in the present invention, before the wash water is discharged, foreign substances present in the wash water are collected in the interior of the filter 73 (S330), and the collected foreign substances are discharged outside along with the wash water (S340).

Specifically, the wash pump 45 is operated (S331), and all of the wash water stored in the storage unit 41 is diverted to the interior of the filter 73 (S332). For example, the flow-switching plate 461 is moved to the location shown in FIG. 6(*b*) in order to open only the circulation passage 475. Since the first and second supply passages 471 and 473 are closed, the wash water is not supplied to the spray arm 6, and all of the wash water introduced into the wash pump 45 moves to the lower storage portion 415 through the circulation passage 475. The wash water introduced through the circulation passage 475 passes through the mesh member 733 of the filter 73 in the direction indicated by the arrow F2, and foreign substances present in the wash water are collected on the inner circumferential surface of the filter 73. Subsequently, the wash pump 45 is consistently operated for a predetermined time period, and thus most foreign substances present in the wash water are collected on the inner circumferential surface of the filter 73.

While the foreign-substance-collecting step (S330) is performed, the wash water moves in the direction indicated by the arrow F2. At this time, the wash water collides with the mesh member 733 of the filter 73. The force generated by this collision separates foreign substances from the outer circumferential surface of the mesh member 733. The separated foreign substances collect inside the mesh member 733 after passing through the wash pump 45 and the circulation passage 475, and are then discharged outside in the draining step (S340). As such, the foreign-substance-collecting step (S330) may also have an effect of removing foreign substances accumulated on the outer circumferential surface of the mesh member 733.

In one embodiment, the wash pump 45 may be operated at a higher speed in the foreign-substance-collecting step (S330) than in the dish-washing step (S320).

For example, assuming that the impeller 457 of the wash pump 45 is rotated at a first number of revolutions per minute (RPM) in the dish-washing step (S320) and is rotated at a second RPM in the foreign-substance-collecting step (S330), the second RPM may be greater than the first RPM. The reason for this is to increase the pressure at which the wash pump 45 sucks the wash water and consequently to remove foreign substances adhering to the outer circumferential surface of the mesh member 733 more easily. In this case, it is possible to enhance an effect of removing foreign substances accumulated on the outer circumferential surface of the mesh member 733 and to shorten the operating time of the foreign-substance-collecting step (S330).

After the collection of foreign substances using the circulation of the wash water is performed for a predetermined time period (S333), the operation of the wash pump 45 is stopped (S334) and the foreign-substance-collecting step (S330) is terminated. Subsequently, the drain pump 441 is operated in order to discharge the wash water and foreign substances outside the dishwasher 1 (S340).

Unlike the above configuration, in the case in which a sensor (not shown) for measuring the contamination of wash water is provided at the dishwasher 1, when the degree of contamination of the wash water is equal to or drops below a predetermined value, the operation of the wash pump 45 may be stopped (S334), and the foreign-substance-collecting step (S330) may be terminated.

As described above, the method of controlling the dishwasher according to the present invention is capable of removing foreign substances from wash water by diverting some or all of the wash water that is supplied to the spray arm 6 to the interior of the filter 73. Accordingly, it is possible to prevent foreign substances separated from the dishes from being again sprayed along with the wash water toward the dishes.

In addition, after the spraying of wash water through the spray arm 6 is completed, all of the wash water stored in the sump 4 may be diverted to the interior of the filter 73, whereby foreign substances present in the wash water may collect in the filter 73. Accordingly, it is possible to discharge most foreign substances along with the wash water in the draining process and to minimize the amount of foreign substances that remain in the sump 4 after the draining process. In addition, it is possible to separate foreign substances from the outer circumferential surface of the filter 73 through the aforementioned circulation process and consequently to prevent foreign substances from accumulating on the filter 73.

MODE FOR INVENTION

Various embodiments have been described in the best mode for carrying out the invention.

INDUSTRIAL APPLICABILITY

The present invention provides a dishwasher that is capable of removing foreign substances from wash water by diverting some or all of wash water that is supplied to a spray arm to the interior of a filter, and a method of controlling the dishwasher.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A dishwasher comprising:
   a tub configured to accommodate one or more objects to be washed;
   a spray arm rotatably disposed inside the tub and configured to spray wash water toward the one or more objects;
   a sump configured to store wash water and to receive wash water sprayed into the tub;
   a filter that defines an opening at a bottom of the filter, that extends to a bottom surface of the sump, and that is separably mounted to the sump, the filter being configured to remove foreign substances from wash water in the sump;
   a wash pump configured to supply wash water stored in the sump to the spray arm; and
   a circulation passage that passes through the bottom surface of the sump and is in fluid communication with an interior of the filter, the circulation passage being configured to guide, to the sump, at least a portion of wash water that is supplied to the spray arm,
   wherein the circulation passage is configured to supply at least the portion of wash water to the interior of the filter.

2. The dishwasher according to claim 1,
   wherein the sump comprises:
      a filter support portion configured to support the bottom surface of the filter;
      a lower storage portion that is disposed vertically below the filter support portion and that is in communication with the interior of the filter through the opening of the filter; and
      an upper storage portion that is disposed vertically above the filter support portion and that is in contact with an outer surface of the filter, and
   wherein the filter support portion separates the upper storage portion from the lower storage portion.

3. The dishwasher according to claim 2, wherein the filter comprises:
   a mesh member that extends into the sump through an upper surface of the sump and that is seated on the filter support portion, the mesh member being configured to remove foreign substances from wash water in the sump; and
   a core member that covers a top of the mesh member, the core member being configured to remove foreign substances from wash water that flows to the mesh member from a region above the upper surface of the sump.

4. The dishwasher according to claim 3, wherein the filter further comprises at least one support rib that is configured to support the mesh member and maintain a shape of the mesh member.

5. The dishwasher according to claim 2, further comprising:
   a drain unit connected to the lower storage portion of the sump and configured to discharge wash water stored in the sump.

6. The dishwasher according to claim 1, further comprising:
   a supply passage configured to guide, to the spray arm, wash water supplied by the wash pump; and
   a flow-switching unit configured to selectively open and close each of the supply passage and the circulation passage.

7. The dishwasher according to claim 3, wherein the flow-switching unit comprises:
   a flow-switching plate that defines at least one opening configured to open at least one of the supply passage or the circulation passage; and
   a flow-switching motor configured to rotate the flow-switching plate.

8. The dishwasher according to claim 7, wherein the supply passage and the circulation passage are configured to be opened simultaneously or selectively based on rotation of the flow-switching plate.

9. The dishwasher according to claim 6, wherein the flow-switching unit comprises a valve configured to selectively open the supply passage or the circulation passage.

10. The dishwasher according to claim 1, further comprising:
    a drain unit that is connected to the bottom surface of the sump and that is configured to communicate with the interior of the filter, the drain unit being configured to discharge wash water stored in the sump.

11. The dishwasher according to claim 1, further comprising:
    a supply passage configured to guide, to the spray arm, wash water supplied by the wash pump,
    wherein the circulation passage is branched from the supply passage.

12. The dishwasher according to claim 1, wherein the circulation passage extends through the sump to a space defined between the bottom of the filter and the bottom surface of the sump.

13. The dishwasher according to claim 1, wherein the bottom of the filter and the bottom surface of the sump are spaced part from each other.

14. The dishwasher according to claim 1, further comprising a sump cover that is disposed at an upper portion of the sump and separates the tub and the sump.

15. The dishwasher according to claim 14, wherein the filter passes through the sump cover.

16. The dishwasher according to claim 15, wherein the filter has a cylindrical shape, and the sump cover surrounds an outer circumferential surface of the filter.

17. The dishwasher according to claim 16, wherein the outer circumferential surface of the filter is in contact with the sump cover.

18. The dishwasher according to claim 14, wherein the sump cover defines a through-hole configured to receive the filter.

19. The dishwasher according to claim 18, wherein an upper surface of the sump cover is configured to support a protrusion of the filter disposed above the through-hole of the sump cover.

* * * * *